(12) United States Patent
Sperber

(10) Patent No.: US 6,646,519 B2
(45) Date of Patent: Nov. 11, 2003

(54) RF EQUALIZER

(75) Inventor: Martin Sperber, Coral Springs, FL (US)

(73) Assignee: Viewsonics, Inc., Pompano Beach, FL (US)

( * ) Notice: Subject to any disclaimer, the term of this patent is extended or adjusted under 35 U.S.C. 154(b) by 10 days.

(21) Appl. No.: 09/851,370

(22) Filed: May 7, 2001

(65) Prior Publication Data

US 2002/0190811 A1 Dec. 19, 2002

(51) Int. Cl.[7] .................................................. H04B 3/04
(52) U.S. Cl. ..................................................... 333/28 R
(58) Field of Search ............................. 333/28 R, 28 T, 333/18

(56) References Cited

U.S. PATENT DOCUMENTS

| | | | |
|---|---|---|---|
| 3,569,869 A | * 3/1971 | Sutton et al. | 333/16 |
| 3,711,767 A | 1/1973 | Campbell, Jr. et al. | 324/51 |
| 3,798,541 A | 3/1974 | Campbell, Jr. et al. | 324/72.5 |
| 4,075,430 A | 2/1978 | Reines | 179/18 J |
| 4,081,613 A | 3/1978 | Reines et al. | 179/18 J |
| 4,263,550 A | 4/1981 | Schweitzer, Jr. | 324/133 |
| 4,283,678 A | 8/1981 | Halter | 324/140 R |
| 4,292,468 A | * 9/1981 | Yokoyama | 330/85 |
| 4,488,126 A | * 12/1984 | Suthers | 333/18 |
| 4,581,577 A | 4/1986 | Nowosad et al. | 324/66 |
| 5,677,633 A | 10/1997 | Moser et al. | 324/539 |
| 5,744,965 A | 4/1998 | Miller et al. | 324/538 |
| 5,886,530 A | 3/1999 | Fasnacht et al. | 324/611 |
| 5,889,399 A | 3/1999 | Schweitzer, Jr. | 324/133 |
| 5,963,110 A | * 10/1999 | Ihara et al. | 333/28 R |
| 5,990,687 A | 11/1999 | Williams | 324/529 |
| 5,999,002 A | 12/1999 | Fasnacht et al. | 324/525 |

* cited by examiner

*Primary Examiner*—Robert Pascal
*Assistant Examiner*—Stephen E. Jones
(74) *Attorney, Agent, or Firm*—Sonnenschein Nath & Rosenthal, LLP; Brian R. McGinley

(57) ABSTRACT

An RF equalizer is implemented using a voltage divider L-attenuator. The RF equalizer provides a frequency variable compensation attenuation and generally includes a series impedance and an impedance to ground (i.e., a shunt impedance). The primary components of the series and shunt impedances are resistances. Preferably, the series impedance also includes a parallel combination of a bypass circuit (e.g., a series inductance and capacitance) and an augmenting circuit (e.g., a capacitor), while the shunt impedance is formed from a series RLC circuit. The bypass circuit, when implemented as a series LC resonant circuit, is preferably tuned to present a minimal impedance (i.e., a short or bypass) around the series resistance at the highest frequency of interest (e.g., 1000 MHz). At frequencies below resonance, the bypass circuit provides a net capacitive reactance which is augmented by the fixed capacitor in the augmenting circuit. In other words, the augmenting circuit presents an additional capacitance in parallel with the net capacitive reactance of the bypass circuit. The series impedance decreases with increasing frequency (and is virtually shorted out at the highest frequency of interest), thereby providing a frequency variable compensation attenuation with desired properties.

3 Claims, 3 Drawing Sheets

RF EQUALIZER

BACKGROUND OF THE INVENTION

The present invention relates to signal equalizers. In particular, the present invention relates to a signal equalizer that compensates for the uneven response, across a frequency range, of devices inserted in the path of a radio frequency communication network.

In the radio frequency (RF) communication field and in particular, broadband technologies such as Cable TV (CATV), a passive component called a splitter is used to distribute a signal to multiple outlets. Conversely, a passive component called a combiner is used to join multiple signals to a common outlet or port. In the CATV environment, the signals are broadband in nature in that they typically occupy a spectrum of 5 MHz through 1000 MHz.

It is desired that the frequency response of passive components not only have a minimum of insertion loss, but also exhibit a loss that is independent of frequency. A typical 8-way splitter/combiner, for example, exhibits an insertion loss of approximately 10 dB at 5 MHz and 12.6 dB at 1000 MHz. The insertion loss yields a downward tilt in frequency response of approximately 2.6 dB. The downward tilt is undesirable, and in conjunction with other elements in the distribution network, creates a severe imbalance in the system end-to-end frequency response flatness.

In addition, coaxial cable contributes to a substantial amount of frequency response tilt proportional to the square root of frequency (with the maximum insertion loss being at 1000 MHz). In the past, coaxial cable equalizer circuits have been developed to compensate for the frequency response tilt caused by the coaxial cable itself. The coaxial cable equalizer circuits are typically implemented as plug-in modules that are associated with system amplifiers and that have a frequency response curve designed to match the coaxial cable frequency response tilt. However, the coaxial cable equalizers are designed under the assumption that the coaxial cable not only has an exact characteristic impedance of 75 ohms, but is also terminated in exactly 75 ohms. As a result, the coaxial cable equalizers do not compensate for the influence of impedance mismatches in the coaxial cable or the cable's terminations.

Passive devices, including those noted above, have a frequency response tilt that is generally directly proportional to frequency. Thus, the passive device frequency response tilt does not track that of the coaxial cable itself. As a result, the prior coaxial cable equalizers were unable to properly compensate for the frequency response tilt arising from passive devices used with the coaxial cable.

A need has long existed in the industry for an RF equalizer that addresses the problems noted above and others previously experienced.

BRIEF SUMMARY OF THE INVENTION

An improved RF equalizer is arrived at by using a voltage divider L-attenuator (referred to below simply as a "voltage divider"). The RF equalizer is preferably incorporated into a network device such as a directional coupler, splitter, combiner, or the like. However, the RF equalizer may be implemented as a stand-alone add-on to existing network devices whose S-parameter characteristics are known.

The RF equalizer provides a frequency variable compensation attenuation and generally includes a series impedance and an impedance to ground (i.e., a shunt impedance). The primary components of the series and shunt impedances are resistances. Preferably, the series impedance also includes a parallel combination of a bypass circuit (e.g., a series inductance and capacitance) and an augmenting circuit (e.g., a capacitor), while the shunt impedance is formed from a series RLC circuit.

The bypass circuit, when implemented as a series LC resonant circuit, is preferably tuned to present a minimal impedance (i.e., a short or bypass) around the series resistance at the highest frequency of interest (e.g., 1000 MHz). At frequencies below resonance, the bypass circuit provides a net capacitive reactance which is augmented by the fixed capacitor in the augmenting circuit. In other words, the augmenting circuit presents an additional capacitance in parallel with the net capacitive reactance of the bypass circuit. The series impedance decreases with increasing frequency (and is virtually shorted out at the highest frequency of interest), thereby providing a frequency variable compensation attenuation with properties described in more detail below.

While the frequency variable compensation attenuation may vary depending on the application, it may, as one example, follow a linear relationship between a first frequency and a second frequency. In the CATV industry, the first frequency may be approximately 5 MHz and the second frequency may be 1000 MHz. Continuing with the example, the linear relationship, at the first frequency, may provide a low frequency attenuation approximately matching a difference in frequency response of a precharacterized network device between the first frequency and the second frequency. In other words, assuming, as an example, that an 8-way splitter has a frequency response 2.6 dB greater at the first frequency than the second frequency, then the low frequency attenuation is preferably 2.6 dB.

Other implementations, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DETAILED DESCRIPTION OF THE INVENTION

As an initial matter it is noted that the discussion below proceeds with reference to an 8-way splitter network device. The RF equalizer is not limited to use with an 8-way splitter, however. To the contrary, the RF equalizer may be used with or be incorporated into any active or passive device having a frequency response curve that may benefit from compensation by the RF equalizer. Thus, the RF equalizer may be incorporated into, as examples, an n-way splitter, an n-way combiner, an amplifier, a filter, and the like.

Figure 1:
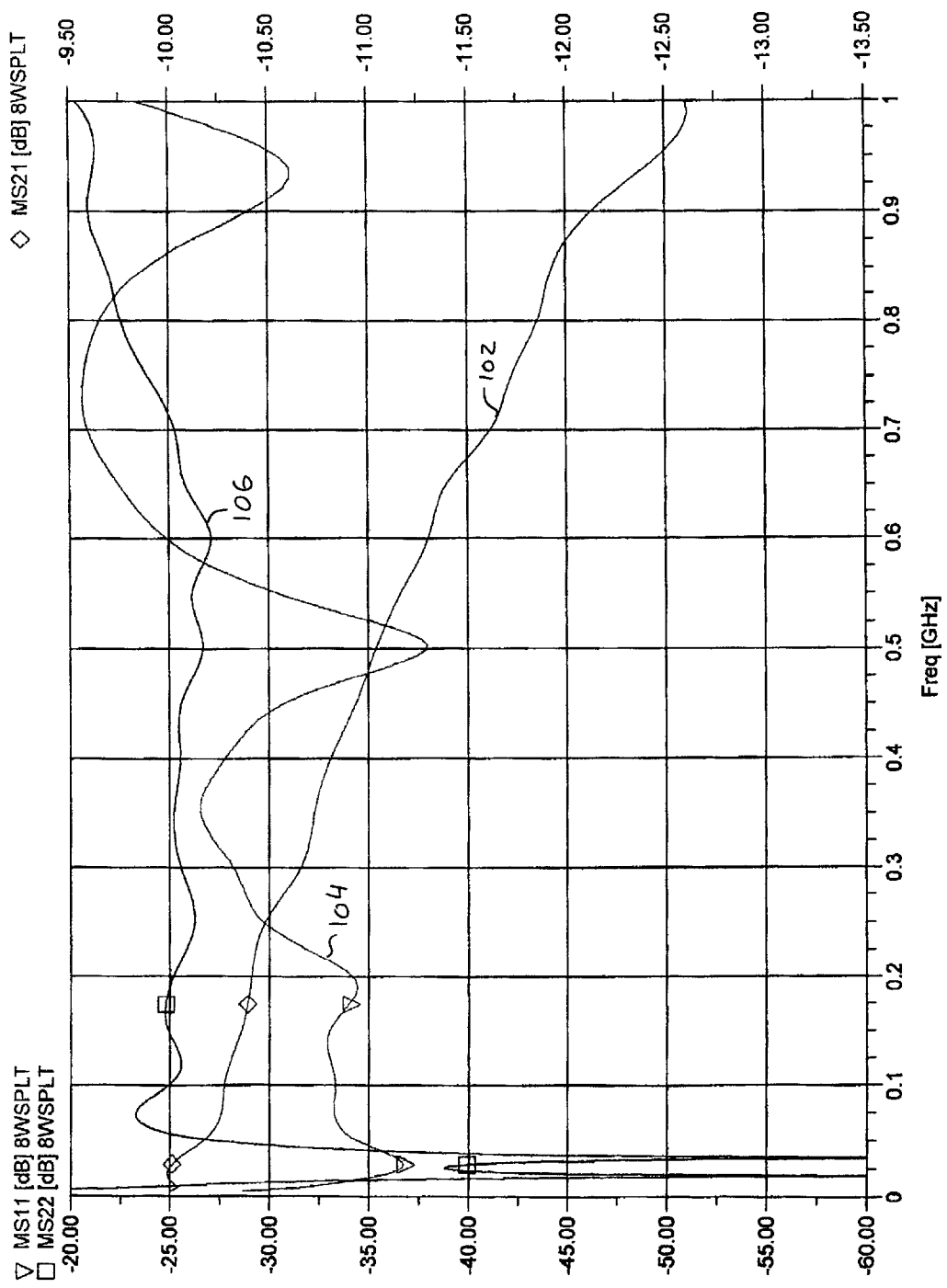
FIG. 1 illustrates a frequency response tilt curve arising from a network device inserted in a communication path.

Turning now to FIG. 1, that figure illustrates a frequency response tilt 102 arising from the use of an 8-way splitter coupled to a communication path (e.g., a coaxial CATV cable). For the CATV systems, the standard coaxial cable impedance (Z) is 75 ohms. A network analyzer indirectly measures disruptions of Z by reading a reflection coefficient typically expressed in decibels (dB). This dB reading is known as return loss (RL). No disturbance of Z means there is no reflected signal energy (i.e., RL=−60 dB or less) due to a mismatch (e.g., an improper cable termination). A short or open circuit condition creates a radical disturbance of Z and reflects nearly 100% of signal energy (i.e., RL=0 dB).

FIG. 1 also includes an input port return loss curve 104 and an output port return loss curve 106 (the 8-way splitter is modeled as a two port device as explained below). Note that the 8-way splitter provides at least −20 dB of return loss across the frequency range of interest (5 Mhz to 1 GHz) on its input and on its outputs. Note also, however, that signals propagating through the 8-way splitter are unevenly attenuated as shown by the frequency response tilt 102. The frequency response tilt 102 is approximately linear with frequency and varies approximately 2.6 dB over frequency, from −10 dB at 5 MHz to −12.6 dB at 1 GHz. The frequency response tilt 102 is in addition to any coaxial cable frequency response tilt, and is not compensated for by standard coaxial cable equalizers. In other words, standard coaxial cable equalizers provide an overall system frequency response in which only the coaxial cable attenuation has been approximately flattened. Furthermore, several cascaded network devices can exacerbate the uncorrected frequency response tilt.

Figure 2:
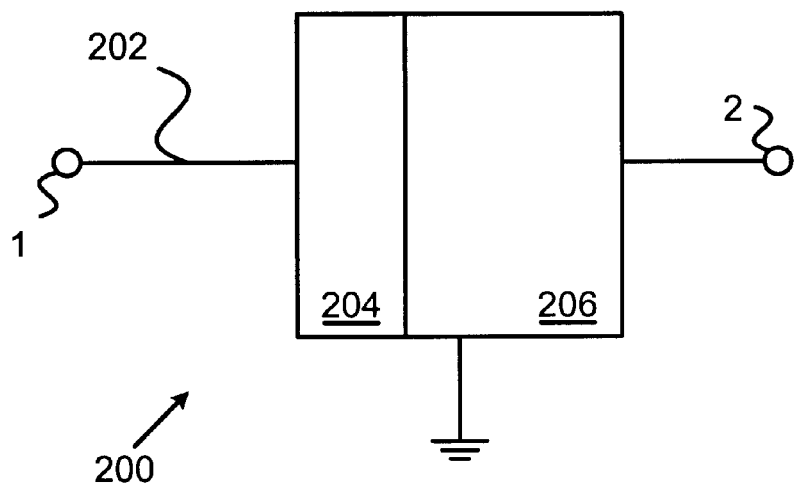
FIG. 2 shows an RF equalizer incorporated into a network device.

Turning next to FIG. 2, that figure illustrates a high level block diagram of frequency compensated network device 200 coupled to a communication path 202. The communication path 202 begins at the input port 1 and ends at the output port 2. The frequency compensated network device 200 includes an RF equalizer 204 and a standard network device circuit 206. The standard network device circuit 206 may be, as examples, an n-way splitter, directional coupler, an n-way combiner, an amplifier, a filter, or the like. In general, the standard network device circuit 206 gives rise to a frequency response tilt (e.g., such as that shown in FIG. 1) that needs to be compensated. The RF equalizer 204 compensates for the frequency response tilt, and as a result, the frequency compensated network device 100 has typically a flat frequency response (e.g., +/−0.4 dB).

In the description below, it is assumed that the RF equalizer 204 will be constructed to provide a frequency variable compensation attenuation to flatten the frequency response tilt 102 associated with the 8-way splitter. In particular, the frequency variable compensation attenuation needs to be approximately 2.6 dB at 5 MHz and decrease linearly with frequency to within 1.5 dB of zero at 1000 MHz. However, the RF equalizer 204 may be designed to provide a frequency variable compensation attenuation to flatten the frequency response of other types of network devices as well, and the discussion below is not limiting, but rather illustrative.

Figure 3:
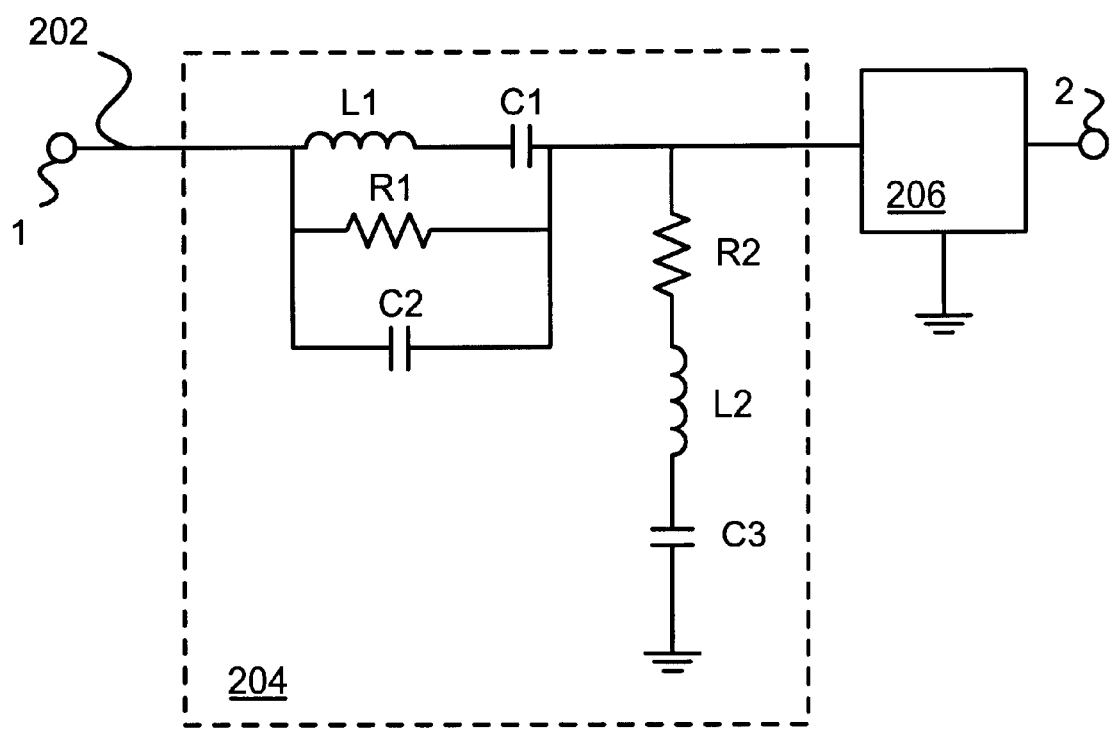
FIG. 3 depicts an RF equalizer.

FIG. 3 shows a detailed implementation of the RF equalizer 204. The RF equalizer 204 is preferably formed as a voltage divider that provides a frequency variable compensation attenuation starting with an initial low frequency attenuation. The voltage divider generally includes a series impedance and a shunt impedance. As shown in FIG. 3, the series impedance includes as a primary component the resistance R1 as well as the parallel combination of a bypass circuit and the augmenting circuit. The bypass circuit is formed from the series resonant circuit formed by L1 and C1, while the augmenting circuit is formed from the capacitor C2. The shunt impedance is formed from the series connection of R2, L2, and C3. As will be shown below, the component values of the voltage divider are chosen to set the initial low frequency attenuation at approximately 2.6 dB.

The augmenting circuit decreases in reactance as frequency increases from 5 Mhz to 1000 MHz. In other words, the augmenting circuit provides a frequency variable impedance across the resistance R1. Effectively, the augmenting circuit increasingly shorts out R1 with increasing frequency, thereby reducing the frequency variable compensation attenuation provided by the RF equalizer 204 as a whole.

The augmenting circuit works in concert with the bypass circuit. The bypass circuit is tuned to provide a frequency selective short circuit across R1 at the highest frequency of interest (e.g., 1000 MHz). However, below resonance, the bypass circuit provides a net capacitive reactance that is augmented by the reactance of the augmenting circuit. Thus, as frequency increases, the series impedance decreases, thereby providing a frequency variable compensation attenuation. The frequency variable compensation attenuation may be tailored to compensate a particular network device frequency response tilt as noted below.

As noted above, the shunt impedance includes the series LC circuit formed from R2, L2, and C3. The shunt impedance provides a low-Q series tuned circuit due to the relatively large series resistance. As a result, the resistance R2 is maximally available at relatively low frequencies (e.g., 5 MHz–100 MHz). The choice to use an RLC circuit for the shunt impedance is preferably made with knowledge of the characteristics of the input impedance of the 8-way splitter. Because the input impedance of the 8-way splitter is reactive and resistive, an RLC circuit allows the RF equalizer 204 to meet the desired performance levels (set forth below). However, the shunt impedance may be varied in form (as may the series impedance) depending on the characteristics of the network device (and frequency ranges) for which the RF equalizer 204 is compensating.

To that end, and given the structure of the RF equalizer 204, an optimization program may be used to determine component values that achieve specified performance criteria. For example, Compact Software's ARRL Radio Designer software may be used with the netlist and performance criteria shown in Table 1 to obtain the components values shown in Table 2.

TABLE 1

| Netlist line | | | | | Comment |
|---|---|---|---|---|---|
| BLK | | | | | |
| SLC | 1 | 90 | C=?4.46936PF? | L=?5.59547NH? | C1, L1 |
| CAP | 1 | 90 | C=?.989799PF? | | C2 |
| RES | 1 | 90 | R=?20.4611? | | R1 |
| SRX | 90 | 0 | R=?249.026? L=?115.492NH? C=?215.999PF? | | R2, L2, C3 |
| TWO | 90 | 100 | 0 | 8W; | |
| 8WSPLT:2POR | 1 | 100 | | | |

TABLE 1-continued

| Netlist line | Comment |
|---|---|
| END | |
| FREQ | |
| ESTP 5MHZ 1000MHZ 511 | |
| END | |
| OPT | |
| 8WSPLT R1=75 R2=75 | |
| F=5MHZ 1000MHZ MS11=−20DB LT MS22=−20DB LT MS21=−12.5DB | |
| TERM=.0001 | |
| END | |
| DATA | |
| 8w: S RREF=75 | |

| **Freq | | MS11 | PS11 | MS21 | PS21 | MS12 | PS12 | MS22 | PS22 |
|---|---|---|---|---|---|---|---|---|---|
| 3.498 | MHZ | 0.04935 | 85.08 | 0.315 | 0.1416 | 0.315 | 0.1416 | 0.1737 | 110.3 |
| 4.746 | MHZ | 0.03849 | 73.02 | 0.3165 | −0.9006 | 0.3165 | −0.9006 | 0.1303 | 104 |
| 5.995 | MHZ | 0.03231 | 61.54 | 0.3157 | −2.158 | 0.3157 | −2.158 | 0.1019 | 98.87 |
| 10.99 | MHZ | 0.02236 | 31.09 | 0.3155 | −5.801 | 0.3155 | −5.801 | 0.04176 | 91.01 |
| 50.95 | MHZ | 0.01906 | −83.09 | 0.3101 | −30.3 | 0.3101 | −30.3 | 0.04393 | −150.7 |
| 100.9 | MHZ | 0.02154 | −144.7 | 0.3064 | −58.65 | 0.3064 | −58.65 | 0.05646 | −166.1 |
| 150.85 | MHZ | 0.02227 | 151.2 | 0.3034 | −87.5 | 0.3034 | −87.5 | 0.05669 | −176.7 |
| 200.8 | MHZ | 0.01957 | 80.49 | 0.3016 | −115.9 | 0.3016 | −115.9 | 0.05495 | −176.6 |
| 250.75 | MHZ | 0.03265 | 10.93 | 0.2992 | −144.6 | 0.2992 | −144.6 | 0.04868 | −178.7 |
| 300.7 | MHZ | 0.03889 | −42.01 | 0.2931 | −174 | 0.2931 | −174 | 0.05266 | 179.6 |
| 350.65 | MHZ | 0.047 | −86.57 | 0.2908 | 157.9 | 0.2908 | 157.9 | 0.05484 | 179.6 |
| 400.6 | MHZ | 0.0407 | −124.7 | 0.2881 | 128.8 | 0.2881 | 128.8 | 0.0528 | 172.8 |
| 450.55 | MHZ | 0.02906 | −165.9 | 0.2839 | 100 | 0.2839 | 100 | 0.05255 | 165.9 |
| 500.5 | MHZ | 0.01264 | 80.78 | 0.2806 | 71.04 | 0.2806 | 71.04 | 0.04625 | 152.2 |
| 550.45 | MHZ | 0.0299 | −0.7202 | 0.2766 | 41.36 | 0.2766 | 41.36 | 0.04921 | 140.3 |
| 600.4 | MHZ | 0.05719 | −44.7 | 0.2722 | 12.32 | 0.2722 | 12.32 | 0.04412 | 124.6 |
| 650.35 | MHZ | 0.07546 | −72.54 | 0.2693 | −17.82 | 0.2693 | −17.82 | 0.05123 | 100.8 |
| 700.3 | MHZ | 0.09002 | −102.7 | 0.2625 | −48.23 | 0.2625 | −48.23 | 0.05423 | 80.68 |
| 750.23 | MHZ | 0.09193 | −125.8 | 0.2593 | −77.66 | 0.2593 | −77.66 | 0.06349 | 48.13 |
| 800.2 | MHZ | 0.08406 | −154.9 | 0.2554 | −109.3 | 0.2554 | −109.3 | 0.07431 | 27.11 |
| 850.15 | MHZ | 0.06364 | 174.6 | 0.2532 | −141.1 | 0.2532 | −141.1 | 0.0807 | 5.615 |
| 900.1 | MHZ | 0.03566 | 117.8 | 0.2475 | −173.1 | 0.2475 | −173.1 | 0.08955 | −7.379 |
| 950.05 | MHZ | 0.0296 | 15.55 | 0.2379 | 153 | 0.2379 | 153 | 0.08955 | −16.71 |
| 1000 | MHZ | 0.0680 | −27.703 | 0.2342 | 119.8 | 0.2342 | 119.8 | 0.09612 | −18.58 |
| END | | | | | | | | | |

As shown in Table 1, the specifications state that the input port 1 return loss is less than −20 dB (MS11=−20 DB LT), the output port 2 return loss is less than −20 dB, and the through loss is fixed at −12.5 dB (MS21=−12.5 DB). Note also that Table 1 specifies (as a two port device) measurements of selected parameters of the 8-way splitter in the DATA block. In particular, the DATA block specifies input port return loss, output port return loss, and through loss in both directions at several frequencies. Any network device that may be characterized by its S-parameters may be used in conjunction with the RF equalizer 204.

The component values shown in Table 2 provide the response specified in Table 1.

TABLE 2

| Component | Value |
|---|---|
| L1 | ~5.6 nH |
| L2 | ~115.5 nH |
| R1 | ~20.5 Ohms |
| R2 | ~249.0 Ohms |
| C1 | ~4.5 pF |
| C2 | ~1.0 pF |
| C3 | ~216.0 pF |

Figure 4:
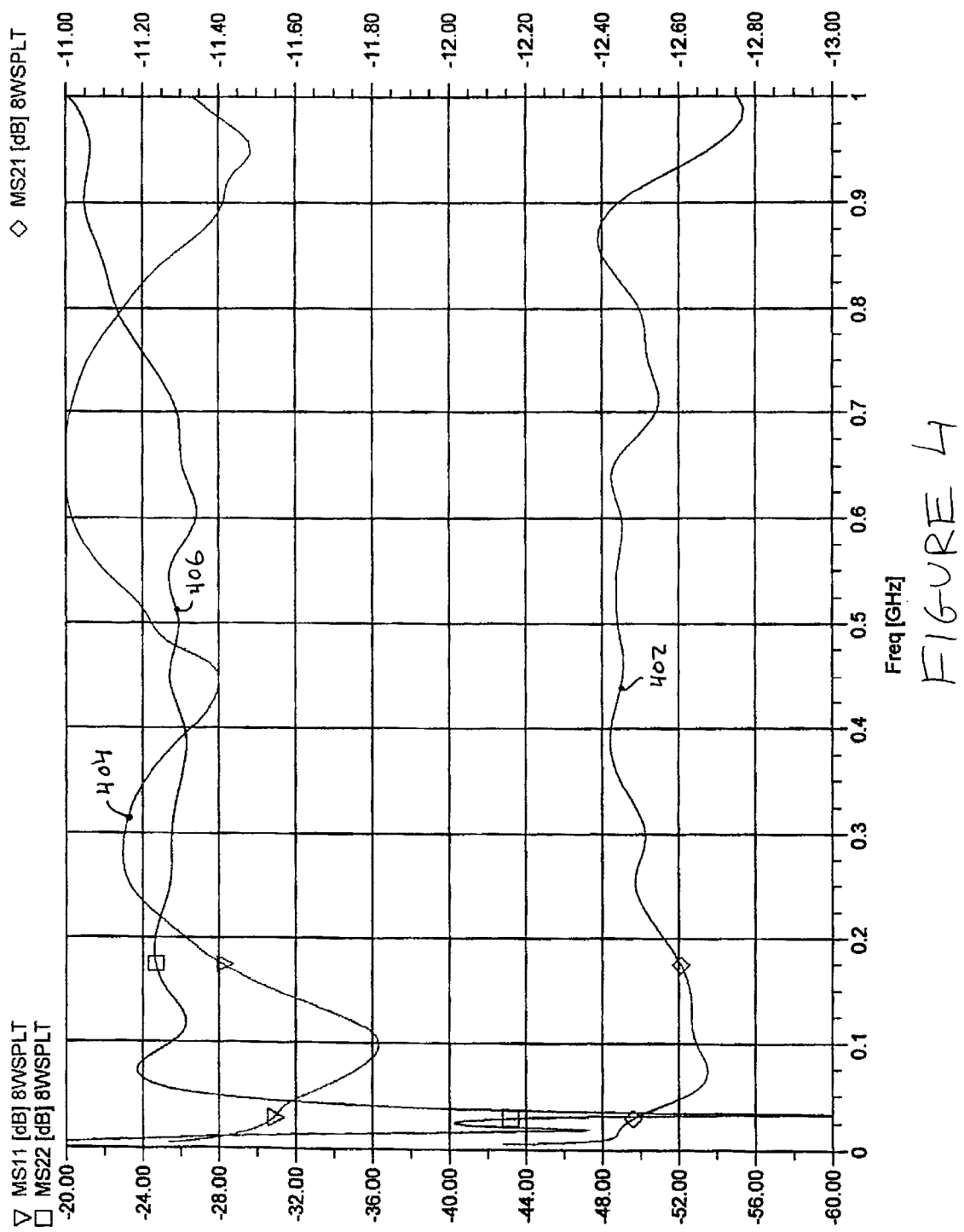
FIG. 4 shows a compensated frequency response curve.

FIG. 4 presents the response of the RF equalizer 204 with the component values specified in Table 2. In particular, FIG. 4 illustrates a compensated frequency response 402 arising from use of the 8-way splitter with the RF equalizer 204. FIG. 4 also includes an input port return loss curve 404 and an output port return loss curve 406 (recall that the 8-way splitter was modeled as a two port device). Note that in combination, the RF equalizer and 8-way splitter continue to provide at least −20 dB of return loss across the frequency range of interest (5 Mhz to 1000 MHz) on its input and on its outputs.

The frequency variable compensation attenuation provided by the RF equalizer 204 has approximately flattened the frequency response tilt 102. In fact, the compensated frequency response only varies by approximately 0.3 dB over frequency. Even using as a first approximation off the shelf component values near those shown in FIG. 2, the RF equalizer 204 provides a compensated frequency response 402 to within 1 dB over frequency. As the off the shelf components are trimmed to more closely correspond to the values shown in Table 2, the compensated frequency response will approach the 0.3 dB frequency variation.

Note also that the RF equalizer 204 presents minimal additional loading. For example, at 1000 MHz, the compensated frequency response 402 is only −12.75 dB, while the frequency response tilt 102 is at −12.6 dB. That is, the RF equalizer 204 adds only 0.15 dB of incremental insertion loss.

Thus, the RF equalizer 204 compensates for the frequency response tilt arising from passive and active devices used inserted into a communication path. The RF equalizer provides an overall frequency response flat to within plus/minus 0.3 dB. Furthermore, the RF equalizer does so with virtually no additional insertion loss (typically 0.15 dB). The RF equalizer may be directly incorporated into a single package with an active or passive device, and thus provide an improved active or passive device with superior frequency response flatness, including those used in 50-ohm and 75-ohm communication systems.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. An RF equalizer providing a frequency variable compensation attenuation, the RF equalizer comprising:
    a series impedance;
    a shunt impedance coupled to the series impedance, the series impedance and the shunt impedance establishing an initial low frequency attenuation for a preselected network circuit;
    a bypass circuit in parallel with the series resistance;
    wherein the series impedance includes a parallel combination of a series resistance and an augmenting circuit providing a frequency variable compensation attenuation;
    wherein the bypass circuit comprises a series resonant LC circuit; and
    wherein the series resonant LC circuit is tuned to provide a short circuit at a highest system frequency of interest.

2. A network device providing a flattened frequency response, the network device comprising:
    a network device circuit characterized by a frequency response tilt; and
    an RF equalizer coupled to the network device, the RF equalizer comprising:
        a series impedance; and
        a shunt impedance coupled to the series impedance, the series impedance and the shunt impedance establishing an initial low frequency attenuation for a preselected network circuit,
    wherein the series impedance includes a parallel combination of a series resistance and an augmenting circuit providing a frequency variable compensation attenuation that approximately flattens the frequency response tilt; and
    wherein the network device circuit is an n-way splitter/combiner circuit.

3. A method for compensating a frequency response tilt associated with a network device circuit inserted into a conununication path, the method comprising:
    providing a voltage divider comprising a series impedance coupled with a shunt impedance, the series impedance and the shunt impedance establishing an initial low frequency attenuation, and the series impedance including a parallel combination of a series resistance and an augmenting circuit providing a frequency variable compensation attenuation;
    propagating a signal through the voltage divider;
    providing a bypass circuit comprising a series resonant LC circuit in parallel with the series resistance; and
    tuning the series resonant LC circuit to provide a frequency selective short circuit at a highest frequency of interest associated with the communication path.

* * * * *